Jan. 9, 1968    D. R. ARNOLD    3,362,393
GAS HEATED TOASTER AND GRILL
Filed March 14, 1966    2 Sheets-Sheet 2

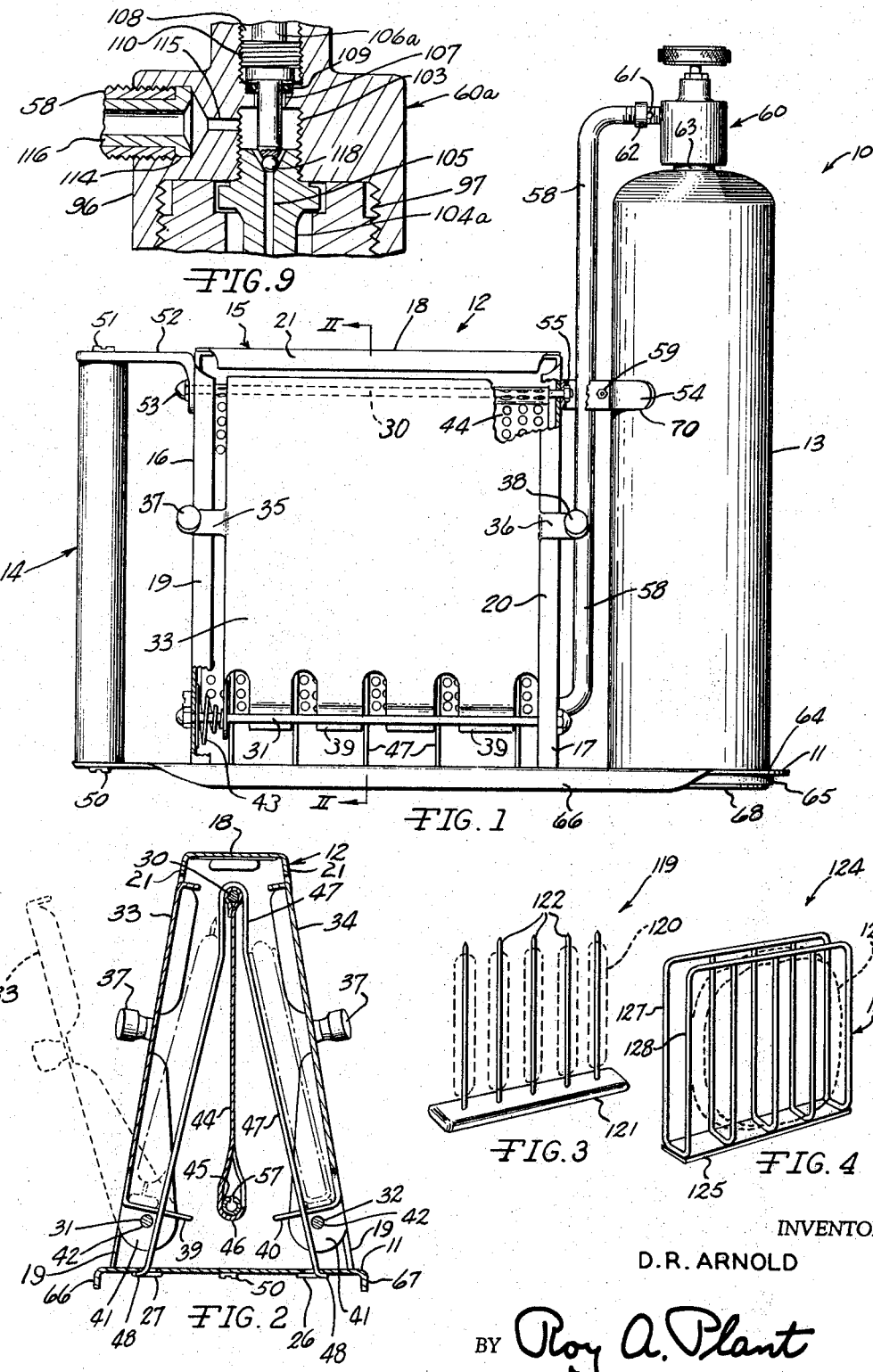

INVENTOR
D. R. ARNOLD

BY Roy A. Plant

ATTORNEY

United States Patent Office 3,362,393
Patented Jan. 9, 1968

3,362,393
GAS HEATED TOASTER AND GRILL
Delevan R. Arnold, Kalamazoo, Mich., assignor to The Arnold Tackle Corporation, Paw Paw, Mich., a corporation of Michigan
Filed Mar. 14, 1966, Ser. No. 534,161
12 Claims. (Cl. 126—41)

The present invention relates broadly to fluid fuel operated apparatus, and in its more specific forms to a portable gas fired apparatus which can be used to supply heat as well as cook and/or toast various items.

In the past the toasting of bread or the like in a gas heated toaster has commonly involved, where the toasting was not done in a gas stove oven with the utilization of the broiler unit, placing a toaster (without a self-contained gas burner) over a lighted gas burner built into the top of the stove so that the hot gases passed up through a truncated square section cone of perforated metal at the outer sides of which to four slices of bread could be laid for toasting, or in another construction through an open compartment between perforated panels forming outlets for the gas adjacent one side of the bread to be toasted and simultaneously through similar compartments in hinged side panels at the outer side of the bread as typically shown in Patent No. 1,288,881. Broilers have also been proposed where the meat to be broiled is placed in a suitable holder and dropped down between bodies of burning charcoal, or even passageways for hot gases from sidewise spaced burners to simultaneously broil opposite sides of the piece of meat with the outer sides of the overall assembly being provided with heat insulating pads to keep same relatively cool as is shown, for instance, in Patent No. 2,031,330. Constructions of these types have been, accordingly, very limited in their use and not satisfactory for transporting to various points as needed, for instance, in connection with camping, picknicking, hunting, ice fishing, et cetera. It was a recognition of these shortcomings of the prior devices which led to the conception and development of the present invention.

Accordingly, among the objects of the present invention is the provision of a unitary portable, self-contained, gas fired assembly suitable for supplying heat to an area such as in an ice fishing shanty, or a small tent or house trailer of various types, and at the same time being available for use in cooking such as toasting bread, and the grilling of hamburgers, as well as frankfurters.

Another object of this invention is to provide a heating and cooking assembly of the character described with bottom hinged doors having means for releasably locking said doors in closed position while facilitating the easy unlocking of same.

Another object of this invention is to make the assembly easily dismantleable for cleaning, which is especially desirable following broiling of hamburgers or the like.

A further object of this invention is to provide the heating and cooking assembly with a central radiant heat emitting metal member at the base portion of which is an elongated tubular gas burner.

A further object is to provide the heating and cooking assembly with readily removable hairpin shaped members for supporting the inner face of the items to be toasted or grilled, and to hold such items further spaced at the bottom of the assembly than at the top to facilitate more even heat distribution over the face of such items than would be the case if said items were equally spaced from top to bottom.

A further object of this invention is to provide same with members for holding items to be grilled, such as frankfurters or hamburgers, while allowing such items to be handled in the grilling process much the same as bread slices being toasted.

A further object is to provide a unitary, self-contained heating, toasting, and grilling apparatus which in one form has its own fuel gas supply tank mounted on and carried by same.

A still further object of this invention is to supply a special form of fuel gas metering valve which is positive in action and reduces the possibility of gas leakage, and wherein an improved gas-air mixing venturi is utilized at the outlet of said valve.

A further object of this invention is to provide a floating action radiant heat emitting member in alinement with the upwardly directed outlet elongated gas burner so that said radiant heat emitting member can expand without buckling when heated by the burning of fuel gas supplied through said burner.

Still further objects and advantages of the invention will appear as the description proceeds.

To the accomplishment of the foregoing and related ends, the invention, then, consists of the features and combinations hereinafter fully described and particularly pointed out in the claims, the annexed drawings and the following description setting forth in detail certain illustrative embodiments of the invention, such disclosed embodiments illustrating, however, but several of various ways in which the principle of the invention may be used.

In the annexed drawings:

FIGURE 1 is an assembly side view of a preferred form of the fluid fuel operated heating and cooking apparatus of the present invention with portions broken away to show some of the inner construction of same.

FIGURE 2 is a sectional view as taken along line II—II of FIGURE 1, looking in the direction of the arrows, with the frankfurter cooker and the meat pattie cooker of FIGURES 3 and 4 illustrated in phantom lines, and also one of the pivoted side panels shown in dashed lines partially tilted outward from closed cooking position.

FIGURE 3 is a perspective view of a frankfurter cooker forming part of this invention, and with the frankfurters shown in dashed lines.

FIGURE 4 is a perspective view of a meat pattie cooker forming part of this invention, and with the meat pattie shown in dashed lines.

FIGURE 9 is an enlarged fragmentary sectional view of the upper portion of a valve such as illustrated in FIGURE 6, but showing a modified construction.

Figure 5:
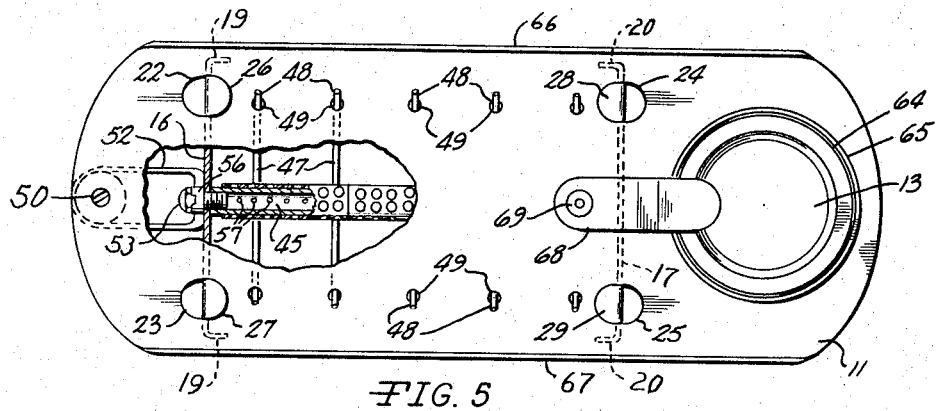
FIGURE 5 is a bottom view of the assembly shown in FIGURE 1, with a portion broken away to show some of the inner construction of same.

Referring more particularly to FIGURES 1, 2 and 3, it will be noted that the construction there shown is fully self-contained and transportable from place to place. This specific form of the heating and cooking assembly 10 has a base portion 11 with a gas fired unit 1 mounted generally centrally thereof. At one end of said base portion is mounted a conventional tank 13 of liquified fuel such as liquified propane commonly referred to as L.P. gas, while the tank itself is known as an L.P. cylinder. The opposite end of the overall assembly 10 is preferably provided with a carrying handle 14.

The gas fired unit 12 has a housing 15 which can be of various forms of construction such as of one piece, or even three pieces such as a first end piece 16 adjacent carrying handle 14, a second end piece 17 adjacent tank 13, and a to piece 18 joining the upper ends of end pieces 16 and 17. This joinder, in turn, can be of disassembleable form as by use of screws or bolts at the meeting points of top piece 18 and end pieces 16 and 17, or it can be semi-permanent through joining procedures such as welding, spot welding, riveting, or brazing and it is intended that the showing in the drawings be considered as diagrammatically illustrating same.

End pieces 16 and 17 are provided with inturned flange side edges 19 and 20 and top piece 18 is likewise provided with the inturned flange edges 21, as shown in FIGURES 1 and 2, with said inturned flange edges serving, among other things, to stiffen the end pieces 16 and 17 as well as said top piece 18. Base portion 11, FIGURE 5, is provided with perforations 22, 23, 24 and 25, while end piece 16 is provided with a pair of ears 26 and 27 on its bottom adjacent the side edges of same, and likewise end piece 17 is provided with a pair of ears 28 and 29 on its bottom adjacent the side edges of same. The pairs of ears 26 and 27 as well as 28 and 29, in their position extending through pairs of perforations 22 and 23 as well as 24 and 25 in base portion 11 preferably are initially bent parallel to the bottom of the assembly and toward the most remote end of said base portion 11. Perforations 22, 23, 24 and 25 are preferably made sufficiently long in a direction lengthwise of said base portion 11 to permit the end pieces to have their ears 26, 27, 28 and 29 preformed and bent sidewise to finished position ready for passage through said perforations either in assembling or disassembling the assembly 10.

Again referring to FIGURES 1 and 2, it will be noted that end pieces 16 and 17 are also connected together by means of an upper bolt 30 and a pair of widely spaced apart lower bolts 31 and 32 which serve to help hold ears 26, 27, 28 and 29 in the assembled position shown in FIGURE 5. The lower pair of bolts 31 and 32 also serve as pivots for the bottom portion of the door member 33 and 34.

Each of the door members is provided with handle ears 35 and 36 at the opposite side edges of same, and those two handle ears in turn are preferably provided respectively with outwardly projecting operating buttons 37 and 38 of heat insulating material such as of a suitable plastic, fiber or wood. Handle ears 35 and 36 also function as stops for door members 33 and 34 so that the latter will fit flush with the side of the assembly when closed, as shown in FIGURE 2. Each of the door members 33 and 34 is provided with inturned bottoms 39 and 40, respectively, to form a support for items to be toasted or grilled. The door members 33 and 34 have the lower portion of their side edges turned inward substantially at right angles to the front of said door members so that each of said door members in finished form has a pair of inbent side ears 41, with ear of said ears having a perforation 42 through which bolts 31 or 32 pass so as to pivotally mount said doors 33 and 34 on the housing 15 of said gas fired unit 12.

The bolts 31 and 32 each preferably carry means for releasably holding said door members 33 and 34 in closed position, and one such construction includes a mild coil spring 43, FIGURE 1, mounted on each of the bolts 31 and 32 between end piece 16 and the adjacent inbent ear 41 of the corresponding door member. The opposite edge of the doors from that engaged by said coil spring preferably has a side edge portion which engages under the inturned flange edge 20 of end piece 17 as limited by handle ear 36 or the like. Thus with the door member 33 or 34 closed, a slight shifting of same to the left as seen in FIGURE 1 will release it for opening. This releasable latching of the door members presents the advantages of keeping the door members closed during transportation and also when picked up by the carrying handle 14.

Figure 7:
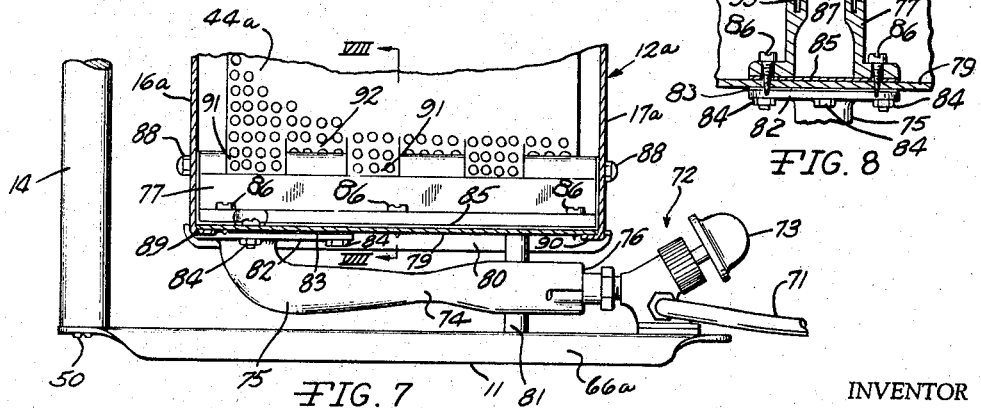
FIGURE 7 is a fragmentary and partially sectioned view of a modified form of the heating and cooking assembly of the present invention adapted for connection to a fuel gas line.

Supported on upper bolt 30, FIGURE 2, of the gas fired unit 12 is a metal panel member 44 which is preferably perforated as shown, and under operating conditions this panel member acts as a heat carrier and heat radiation means. The lower end of panel member 44 is slit vertically at spaced intervals, as shown in FIGURE 7, and bent alternately in opposite directions with the end of each portion between slits being formed of hook shape to provide a cradle 46 for burner 45, as shown in FIGURE 2. This cradle 46 preferably has its sides adjacent its hook shaped ends substantially parallel for a short distance above which it tapers to the substantially flat plane portion directly above burner 45, which forms the major portion of panel member 44. This type of construction allows panel member 44 to freely elongate when hot, and also facilitates the heating of this panel member by direct flame contact when burner 45 is in operation.

Mounted inside the gas fired unit 12 and supported by upper bolt 30 are a series of hairpin shaped members 47, the lower ends of which are bent either outward or inward to form hooks 48, diagrammatically shown, which pass through perforations 49 in base portion 11, FIGURES 2 and 5. These hairpin shaped members 47 are preferably uniformly spaced apart sidewise and support the inner face of the items to be toasted or grilled in the course of operating the overall assembly 10. By spacing the opposite side members of the hairpin shaped members 47 close together at their top and wide apart at their lower end provides for a more uniform application of radiated heat to the inner face of the items being toasted or grilled than would be the case if they were equally spaced apart from top to bottom. Also providing the hairpin shaped members 47 with hook ends 48 facilitates dismantling and reassembling the gas fired unit when same is taken apart, for instance, for cleaning after grilling items such as hamburgers or sausage.

Carrying handle 14, FIGURE 1, may be made of any suitable material such as wood, plastic, hard rubber, metal tubing, or even a solid member drilled and threaded at each end to threadedly receive and hold screws 50 and 51. The lower end of carrying handle 14 is anchored to the adjacent end of base portion 11 by screw 50 as shown in FIGURES 1 and 5. The upper end of handle 14 is joined to angle bracket 52 at one end of same by means of screw 51, while the downturned end of said bracket 52 is joined to the side of the end piece 16 of gas fired unit 12 by means of a nut 53, FIGURE 1, on the upper bolt 30 which binds angle bracket 52 tight against said end piece 16. The opposite end of upper bolt 30 passes through the base end of a U-shaped bracket 54 which is firmly gripped against end piece 17 by means of a nut 55.

Burner 45, FIGURE 2, is closed at the handle end of the assembly 10 by means of a screw 56, FIGURE 5, which passes through a suitable size perforation in end piece 16 and threadedly engages the inside surface of burner 45 which is preferably tubular, and provided with substantially equally spaced gas outlet openings 57 approximately full length of said tubular burner inside of the gas fired unit 12. At the end of said burner 45 adjacent tank 13, same connects to a fuel line, which may be a continuation of same, in the form of tube 58 which extends upward between the opposite side arms of U-shaped bracket 54 where bolt 59 grips same firmly in upright position. The upper end of fuel line tube 58 turns outward with the end of same externally threaded and screwed tightly into the outlet of valve assembly 60, FIGURE 6. Adjacent said valve assembly 60, the tube 58 is cross drilled to provide an air inlet 61, with an internally threaded sleeve 62 fitting said threads on the outturned end portion of fuel line tube 58 and adapted to be threadedly moved to vary the exposed area of said air inlet and thus control the air-fuel mixture for satisfactory burning when same is ignited above openings 57 of burner 45, FIGURE 2.

Valve assembly 60 in turn is threadedly screwed onto the outlet member 63 of tank 13 for operation as will be hereinafter described. Base portion 11, at the end of the assembly 10 carrying tank 13, is provided with an opening 64 in position to receive the bottom of tank 13 as seen in FIGURE 1, and such opening 64 is preferably provided with a downturned flange 65 to give a pleasing appearance and at the same time added support for the side of tank 13 adjacent its bottom. This flange 65 can be formed at the same time as the side flanges 66 and 67 on the bottom of base portion 11, but is shallower than same to provide clearance for the tank supporting arm 68 rotatably mounted on pivot 69, FIGURE 5. This supporting arm is pivoted so that same can be moved from in under tank 13 when same is being either removed or replaced in the assembly, and when the tank is in place this arm can be pivoted into position under the tank, FIGURE 5, to provide support for same. The outer ends 70 of U-shaped bracket 54 provide side support for tank 13 while fuel line tube 58 stabilizes the upper end of said tank for both transportation and use of the overall assembly 10.

Figure 8:
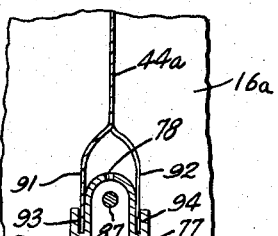
FIGURE 8 is a fragmentary sectional view of a modified construction as taken along line VIII—VIII of FIGURE 7, looking in the direction of the arrows.

A modified construction is shown in FIGURES 7 and 8 and which is adapted for conventional connection by means of a flexible fuel line 71 to a fixed location source of fuel gas (not shown), such as is used in a travel trailer or mobile home for supplying a gas stove and/or gas operated refrigerator. This fuel line 71 is conneced to a gas flow control valve 72 having an operating handle or knob 73. When this valve is opened it delivers the gas in a stream under pressure into the venturi portion 74 of the gas and air mixing tube 75 where it draws air into the open end 76 of tube 75 and starts mixing this air with the gas at and beyond the venturi 74. Within the gas fired unit 12a, FIGURES 7 and 8, there is provided a gas-air mixture manifold 77 having a series of burner outlets 78, FIGURE 8, along its top. A manifold supporting panel 79 with side flanges 80, FIGURE 7, is conventionally mounted on a pair of supporting posts 81. Said manifold supporting panel has an opening therethrough (not shown) to connect the outlet end of the air and gas mixing tube 75 to the inlet of manifold 77 so that the fuel gas supplied through valve assembly 72 can pass through manifold 77 and out of its burner outlets for burning in conventional manner. The outlet end of the air and gas mixing tube 75 is provided with a sidewise extending planar flange 82 with a gasket 83 between said flange 82 and the manifold supporting panel 79 with a gas passageway opening therethrough. The flange 82 and panel 79 are conventionally fastened together as by means in the form of threaded members 84. Manifold 77 likewise is provided along its underface and over supporting panel 79 with a gasket 85 open at the gas inlet passageway into said manifold. Said manifold 77 and manifold supporting panel 79 with said gasket 85 therebetween are conventionally fastened together by means of threaded member 86. Gasket 85 also extends up the ends of manifold 77 between same and end members 16a and 17a with a bolt 87, FIGURE 8, having nuts 88, FIGURE 7, on its ends outside said end members being tightenable to seal the ends of said manifold 77, while said end members 16a and 17a have inturned bottom ears 89 and 90 which engage under supporting panel 79 while the major portion of said end members 16a and 17a engage the top of said supporting panel 79 to stabilize the assembly and yet permit ready disassembly and reassembly when bolt 87 is disconnected along with bolts 30, 31 and 32, FIGURE 2. Panel member 44a has a modified lower edge as compared with panel member 44 of FIGURE 1, in that, as shown in FIGURES 7 and 8, this panel member 44a has oppositely bent alternating substantially parallel tongue members 91 and 92 the bottom edges of which loosely fit into deep grooves 93 and 94, respectively, of manifold 77. This construction allows free up and down movement of the tongues 91 and 92 of panel member 44a under conditions of expansion and contraction of this panel member under operating conditions when these grooves are deep enough to allow panel member 44a to fully expand when hot.

Figure 6:
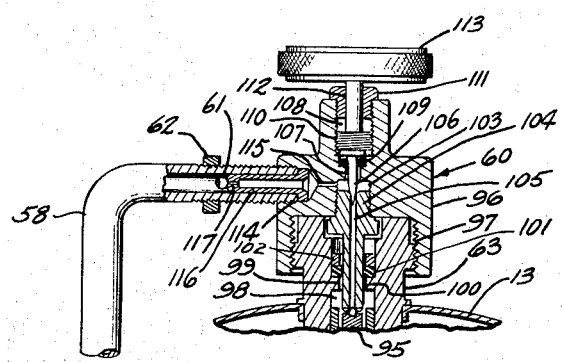
FIGURE 6 is a fragmentary sectional view of an upper portion of the assembly shown in FIGURE 1, and more particularly of the inner portion of an improved valve assembly forming a unique part of the present invention.

Now referring to the valve assembly shown in section in FIGURE 6, and mounted on outlet member 63 of tank 13, it will be noted that the upper end of a sealing valve 95 is shown and in the common commercial form conventionally used is the same as or very similar to the Shcrader valve used in automobile tire valve stems. In other words, tank 13, charged with liquified propane gas or the like, is purchaseable on the open market with this valve 95 preventing the gas from escaping. However, when this valve 95 is purposely depressed inwardly into the tank it allows the gas to escape past this valve 95. The mounting of valve assembly 60 on the outlet member 63 of tank 13 utilizes this principle as will be hereinafter described.

Now referring again to FIGURE 6, it will be noted that the valve assembly 60 has a body member 96, the lower end of which has an internally threaded counterbore 97 which threadedly receives the externally threaded upper end of outlet member 63 of tank 13. This outlet member 63, as previously mentioned has its lower end closed with a depressable tank sealing valve 95, which in turn is conventionally anchored in a counterbore 98 in the lower end of outlet member 63. This counterbore 98 terminates at an annular shoulder 99 which has a central passageway 100 of a size to permit the passage therethrough of tank sealing valve 95 for the installation of same in operating position. Above said annular shoulder 99 in a continuation of counterbore 98 is a gasket 101 of a suitable resilient material unaffected by the liquified L.P. gas stored in tank 13, and in turn gasket 101 is firmly held in place by an annular ring 102 which may be press fit into said continuation of counterbore 98 or otherwise anchored therein by threads or the like, and the showing is intended to diagrammatically illustrate same.

The upper end of counterbore 97 is provided with a smaller counterbore 103, the lower portion of which is threaded for the reception of the externally threaded upper end of a depressing member 104 for tank sealing valve 95. This depressing member 104 is provided with a full length center passageway 105, the lower end of which is cross grooved or otherwise opened into counterbore 98 while the upper end of said passageway 105 is tapered to provide a valve seat for needle portion 106 of valve assembly 60. This needle portion 106 passes through a passageway 107, while directly above said passageway 107 the valve body member 96 is provided with an enlarged and internally threaded counterbore 108. In the bottom of this counterbore 108 is fitted a suitable size O-ring 109 to seal valve assembly 60 against gas leakage past needle portion 106 and the threaded enlargement 110 of same in said counterbore 108. The top of counterbore 108 is closed by a threaded plug 111 having a central counterbore 112 to closely fit the upper end of needle portion 106, the top of which has conventionally anchored thereon, by splines or the like (not shown), a knurled operating knob 113 for operatively rotating needle portion 106.

A counterbore 114 threadedly connects the threaded end of fuel line tube 58 to the side of valve body member 96, with the innerend of said counterbore 114 being connected to counterbore 103 by means of a small passageway 115. Fitting inside of the end of fuel line 58 is an outward flanged head hollow sleeve member 116 of a suitable material such as metal, or plastic such as nylon, or the like, the outer end of which is provided with a small concentric outlet orifice 117 terminating at air inlet 61 so that the flow of gas through outlet orifice 117 creates a venturi effect to draw air into fuel line tube 58 through air inlet 61 to form a suitable combustion mixture which can be varied by endwise adjustment of sleeve 62 relative to air inlet 61, and the amount of the latter covered by said sleeve.

The valve assembly 60a shown in FIGURE 9 is substantially the same as the construction shown in FIGURE 6, except that the depressing member 104a has a tapered upper end which has a taper substantially in the range of 20° to 45° and preferably approximately 25° in which a ball bearing ball 118 is adapted to seat. The valve member 106a has a blunt lower end preferably slightly recessed to better fit the ball 118 with the sides of such end preferably being of approximately the same taper as the taper of the ball receiving end of depressing member 104a so as to provide a free annular conical passage for the gas flow when valve member 106a is moved to the desired open position to produce a suitable flame size for the burner.

While the door members 33 and 34 are adapted to receive and hold slices of bread, bun halves, frozen waffles or the like (not shown) up against hairpin shaped members 47 for toasting or reheating with the assembly in operation, this assembly 10 is also adapted for the grilling of meat or other foods. Referring to FIGURE 3 there is illustrated an adapter 119 for the grilling of frankfurters 120. This adapter has a base member 121 having uniformly spaced frankfurter impaling members 122 with sharpened points. With the frankfurters 120 in place on adapter 119, same is ready for inserting in the gas fired unit 12 in the same manner as a slice of bread. In this situation the impaling members 122 preferably line up opposite to the hairpin shaped members 47 to better support the side of the frankfurters 120 during the grilling of same. Where a hamburger or other meat pattie 123 is to be broiled or grilled, a special pattie holder 124 is preferably used as shown in FIGURE 4. Here there is preferably provided a base member 125 having mounted thereon a wire frame 126 with spaced apart sides 127 and 128 to hold a meat pattie 123 therebetween for broiling or grilling. When the meat pattie 123 is done on one side the holder 124 (the same as frankfurter holder 114) is reversible for broiling or grilling the other side of same.

The use of this overall assembly 10, as shown in FIGURES 1, 2 and 5, involves first supplying same with a tank 13 of suitable liquified gas. This is done by turning supporting arm 68 to one side so that tank 13 can be passed up through opening 64 in base portion 11 until the threaded end of outlet member 63 engages the threaded counterbore 97 of valve assembly 60, FIGURES 1 and 6, whereupon rotating tank 13 causes the threads on outlet member 63 to engage the threads in the bottom of valve assembly 60. When this threaded engagement of 63 with 60 is partially completed, depressing member 104 depresses tank sealing valve 95 and starts opening same as the rotation of tank 13 is continued to completion. The assembly is then ready for operation after supporting arm 68 is swung under tank 13 to provide bottom support for same, and operating knob 113 is turned to allow the desired amount of gas to flow to the burner where same is then conventionally ignited for heating, toasting, or cooking, as desired.

Other modes of applying the principle of my invention may be employed, instead of those explained, change being made as regards the heating device and combinations herein disclosed, provided the means stated by any of the following claims or the equivalent of such stated means be employed.

I therefore particularly point out and distinctly claim as my invention:

1. A heating device also adapted for grilling and toasting, which comprises a housing, at least one door on said housing at one side thereof, pivot means connecting said door to said housing adjacent the bottom thereof, at least one elongated burner unit inside, lengthwise, and adjacent the bottom of said housing in the central portion of same, means for operably connecting said burner unit to a suitable source of fluid fuel, and a heat radiator panel means having a major portion of same substantially in vertical position over said burner unit in position to be heated thereby for conducting and radiating heat sidewise therefrom, wherein there is means for releasably locking said door in closed position, and wherein said means for releasably locking said door in closed position includes means for mounting said door for edgewise shifting, a cooperating portion of said housing releasably engageable by a side portion of said door when in closed position, and resilient means urging said door in edgewise direction to releasably engage said housing when said door is closed.

2. A heating device as set forth in claim 1, wherein there is a rod means for fixedly suspending the upper portion of said heat conducting and radiating panel within the upper portion of said housing, said panel having a multiplicity of vertical slits in its lower edge forming a series of tongues alternately extending outward and downward alongside said burner unit in position for direct application of heat thereto by said burner while facilitating free expansion of said panel when heated.

3. A heating device which comprises a housing having end panels, doors on opposite sides of said housing, means hingedly mounting said doors on said housing adjacent the bottom of same, at least one elongated tubular fluid fuel burner unit inside, lengthwise, and adjacent the bottom of said housing in the central portion of same, means for operably connecting said burner unit to a suitable source of fluid fuel, a heat radiating and conducting single metal panel means within said housing with its bottom extending on opposite sides of said burner and having a major portion of same above said burner and substantially in vertical position over same in position to be direct flame heated thereby at its lower end, said panel means, under operating conditions, conducting heat therethrough and also radiating heat sidewise therefrom, and means suspending said panel means from its upper end, with the lower end of said panel means being freely movable to and from said suspension means and on opposite sides of said burner unit.

4. A heating device as set forth in claim 3, wherein there is means for applying edgewise pressure on said doors to facilitate releasably locking same in closed position.

5. A heating device which comprises a housing having end panels, doors on opposite sides of said housing, means hingedly mounting said doors on said housing adjacent the bottom of same, at least one elongated fluid fuel burner unit inside, lengthwise, and adjacent the bottom of said housing in the central portion of same, means for operably connecting said burner unit to a suitable source of fluid fuel, and a heat radiator panel means within said housing and having a major portion of same substantially in vertical position over said burner unit in position to be directly heated thereby to facilitate conducting heat therethrough and also radiating heat sidewise therefrom, wherein there is means for releasably locking said doors in closed position, and wherein said means for releasably locking said doors in closed position includes pivot means mounting said doors for edgewise shifting, a cooperating portion of said housing releasably engageable by a side portion of each of said doors when in fully closed position, and a resilient mild compression spring for each of said doors which urges same in edgewise direction so that each door will releasably engage said cooperating portion of said housing when said door is fully closed.

6. A heating device which comprises a housing having end panels, doors on opposite sides of said housing, means hingedly mounting said doors on said housing adjacent the bottom of same, at least one elongated fluid fuel burner unit inside, lengthwise, and adjacent the bottom of said housing in the central portion of same, means for operably connecting said burner unit to a suitable source of fluid fuel, and a heat radiator panel means within said housing and having a major portion of same substantially in vertical position over said burner unit in position to be directly heated thereby to facilitate conducting heat therethrough and also radiating heat sidewise therefrom wherein each of said doors has an inturned bottom portion for supporting items to be toasted or grilled, and separate holding means mountable on said inturned bottom portion for supporting said items to be toasted or grilled.

7. A heating device which comprises a housing having end panels, doors on opposite sides of said housing, means hingedly mounting said doors on said housing adjacent the bottom of same, at least one elongated fluid fuel burner unit inside, lengthwise, and adjacent the bottom of said housing in the central portion of same, means for operably connecting said burner unit to a suitable source of fluid fuel, and a heat radiator panel means within said housing and having a major portion of same substantially in vertical position over said burner unit in position to be directly heated thereby to facilitate conducting heat therethrough and also radiating heat sidewise therefrom wherein said end panels have hooks on their lower ends with said hooks on each of said end panels being substantially at right angles to same and with the hooks on one end panel being directed in opposite direction to the hooks on the other end panel, a base panel having openings therein of a size to allow said end panel hooks to pass therethrough and engage one side of said openings when in final set-up position, and means for releasably anchoring said end panels to said base panel.

8. A heating device which comprises a housing having end panels, doors on opposite sides of said housing, means hingedly mounting said doors on said housing adjacent the bottom of same, at least one elongated fluid fuel burner unit inside, lengthwise, and adjacent the bottom of said housing in the central portion of same, means for operably connecting said burner unit to a suitable source of fluid fuel, and a heat radiator panel means within said housing and having a major portion of same substantially in vertical position over said burner unit in position to be directly heated thereby to facilitate conducting heat therethrough and also radiating heat sidewise therefrom wherein said housing has a base member, means for releasably joining the bottom of said end panels to said base member, and readily releasable means joining said end panels together, whereby said heating device may be easily disassembled for cleaning and quickly reassembled for use once more.

9. A heating device as set forth in claim 8, wherein said means for releasably joining the bottom of said end panels to said base member is in the form of hooks on the lower ends of said end panels with said hooks on each of said end panels being substantially at right angles to same and with the hooks on each end panel being directed toward the hooks on the other end panel, said base panel having elongated openings therein of a size to allow said end panel hooks to pass therethrough and engage one side of said openings in said base panel when in final set-up position, and said means for releasably joining said end panels together is in the form of bolts extending through both end panels and tightenable to draw both end panels into final assembled position with said hooks of said end panels being engaged with said elongated opening portion of said base panel.

10. A self-contained heating device, which comprises a base member, a carrying handle member mounted on one end of same, a fluid fuel supply container at the other end of said base member, and a unit for heating, grilling and toasting mounted on said base member between said handle member and said fuel supply container, means connecting said carrying handle member, heating unit, and fuel supply container together, said unit for heating, grilling and toasting having at least one elongated burner unit inside and lengthwise of said heating unit adjacent the bottom in the central portion of same, a fuel supply container means operably connecting said burner unit to said fuel supply container, a heat conducting and radiating panel of perforated metal above said heating unit in position to be directly flame heated thereby, said panel acting to conduct heat therethrough and radiate heat sidewise therefrom for grilling and toasting use, and removable hairpin-shaped wires with outward flaring bottom portions at opposite sides of said panel in position to support the adjacent side of items to be heated.

11. A self-contained heating device, which comprises a base member, a carrying handle member mounted on one end of same, a fluid fuel supply container at the other end of said base member, and a unit for heating, grilling and toasting mounted on said base member between said handle member and said fuel supply container, means connecting said carrying handle member, heating unit, and fuel supply container together, said unit for heating, grilling and toasting having at least one elongated burner unit inside and lengthwise of said heating unit adjacent the bottom in the central portion of same, means operably connecting said burner unit to said fuel supply container, and a heat conducting radiator panel above said heating unit in position to be directly heated thereby and to conduct heat therethrough and radiate heat sidewise therefrom for grilling and toasting use wherein said unit for heating, grilling and toasting has a housing with end members and doors on opposite sides of same, pivot means for pivotally mounting said doors on said end members adjacent the outer bottom edge of same, said pivot means permitting sidewise movement of said doors, each of said doors and a corresponding end member of said housing having interengaging portions for releasably locking said doors in closed position, and separate resilient means for urging each of said doors into releasable locking engagement with said housing end member when said doors are in fully closed position.

12. A self-contained heating device, which comprises a base member, a carrying handle member mounted on one end of same, a fluid fuel supply container at the other end of said base member, and a unit for heating, grilling and toasting mounted on said base member between said handle member and said fuel supply container, means connecting said carrying handle member, heating unit, and fuel supply container together, said unit for heating, grilling and toasting having at least one elongated burner unit inside and lengthwise of said heating unit adjacent the bottom in the central portion of same, means operably connecting said burner unit to said fuel supply container, and a heat conducting radiator panel above said heating unit in position to be directly heated thereby and to conduct heat therethrough and radiate heat sidewise therefrom for grilling and toasting use, means for supporting said heat conducting radiator panel adjacent the top of said heating unit with the lower edge of said radiator panel being held in fixed position while permitting same to freely expand when heated, said unit for heating, grilling and toasting having a housing with end members which are wider at their bottom than at their top and doors on opposite sides of same, pivot means for pivotally mounting said doors on said end members adjacent the outer bottom edge of same, said pivot means permitting sidewise movement of said doors, each of said doors and a corresponding end member of said housing having interengaging portions for releasably locking said doors in closed position, separate resilient means for urging each of said doors into releasable locking engagement with said housing end member when said doors are in fully closed position, removable generally hairpin shaped members, the legs of which extend downward at opposite sides of said radiator panel and angling outward substantially parallel to said doors but spaced inward from same to receive the items to be toasted or grilled between said hairpin shaped members and said doors, each of said doors having an inturned bottom portion for supporting items to be toasted or grilled, and means mountable on said inturned bottom portion for holding said items to be toasted or grilled.

References Cited
UNITED STATES PATENTS

| | | | |
|---|---|---|---|
| 493,801 | 3/1893 | Weldon | 126—41 |
| 706,502 | 8/1902 | Van Wie | 99—393 |
| 1,149,257 | 8/1915 | Green | 99—393 |
| 2,285,127 | 6/1942 | Rerucha | 126—41 |
| 2,841,133 | 7/1958 | Schwank | 126—4 X |
| 3,062,127 | 1/1962 | Lang | 99—401 |
| 3,103,160 | 9/1963 | Forniti et al. | 99—393 |
| 3,122,134 | 2/1964 | Reeves | 126—41 |

FREDERICK L. MATTESON, JR., *Primary Examiner.*

E. G. FAVORS, *Assistant Examiner.*